(12) United States Patent
Hirota et al.

(10) Patent No.: US 12,104,221 B2
(45) Date of Patent: Oct. 1, 2024

(54) METAL STRIP INDUCTION HEATING METHOD AND INDUCTION HEATING APPARATUS

(71) Applicant: NIPPON STEEL CORPORATION, Tokyo (JP)

(72) Inventors: Yoshiaki Hirota, Tokyo (JP); Masato Taira, Tokyo (JP); Shigeki Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 620 days.

(21) Appl. No.: 16/979,488

(22) PCT Filed: Mar. 12, 2019

(86) PCT No.: PCT/JP2019/010041
§ 371 (c)(1),
(2) Date: Sep. 9, 2020

(87) PCT Pub. No.: WO2019/181653
PCT Pub. Date: Sep. 26, 2019

(65) Prior Publication Data
US 2021/0017624 A1 Jan. 21, 2021

(30) Foreign Application Priority Data
Mar. 23, 2018 (JP) .................................. 2018-056337

(51) Int. Cl.
*C21D 9/60* (2006.01)
*C21D 1/42* (2006.01)
(Continued)

(52) U.S. Cl.
CPC ................. *C21D 9/60* (2013.01); *C21D 1/42* (2013.01); *G05D 3/10* (2013.01); *H05B 6/101* (2013.01)

(58) Field of Classification Search
CPC ... C21D 9/60; C21D 1/42; G05D 3/10; H05B 6/101
(Continued)

(56) References Cited

U.S. PATENT DOCUMENTS 4,778,971 A 10/1988 Sakimoto et al.
10,040,107 B2 * 8/2018 Sano ..................... B21B 45/004
(Continued)

FOREIGN PATENT DOCUMENTS

JP 62-218564 A 9/1987
JP 2-89757 A 3/1990
(Continued)

OTHER PUBLICATIONS

Machine Translation of JPH11251048A ; Feb. 2023 (Year: 2023).*

*Primary Examiner* — Nathaniel E Wiehe
*Assistant Examiner* — Thomas J Ward
(74) *Attorney, Agent, or Firm* — SOLARIS Intellectual Property Group, PLLC

(57) ABSTRACT

An induction heating method for a metal strip is provided to heat a continuously conveyed metal strip using an induction heating device disposed at a first position on a pass line. The induction heating method includes a step of detecting a displacement from a predetermined datum line of a width direction center line of the metal strip at a second position on the pass line that is different from the first position, a step of computing an estimated displacement of the width direction center line of the metal strip at the first position by temporal and spatial extrapolation of the displacement based on a function expressing a time series of changes in the displacement, and a step of controlling a relative positional relationship between the induction heating device and the metal strip in a width direction of the metal strip based on the estimated displacement.

6 Claims, 13 Drawing Sheets

(51) Int. Cl.
*G05D 3/10* (2006.01)
*H05B 6/10* (2006.01)
(58) Field of Classification Search
USPC .......................................... 219/645
See application file for complete search history.

(56) References Cited

U.S. PATENT DOCUMENTS

2002/0011486 A1  1/2002  Anderhuber et al.
2010/0108665 A1  5/2010  Hirota
2017/0260604 A1*  9/2017  Taira ........................ F27D 19/00

FOREIGN PATENT DOCUMENTS

| | | | |
|---|---|---|---|
| JP | 2-153024 A | 6/1990 | |
| JP | 6-37676 B2 | 5/1994 | |
| JP | 6-22950 Y2 | 6/1994 | |
| JP | H11251048 A * | 3/1998 | ............... H05B 6/06 |
| JP | 11-251048 A | 9/1999 | |
| JP | 2001-6866 A | 1/2001 | |
| JP | 2002-8838 A | 1/2002 | |
| JP | 2008-288200 A | 11/2008 | |

\* cited by examiner

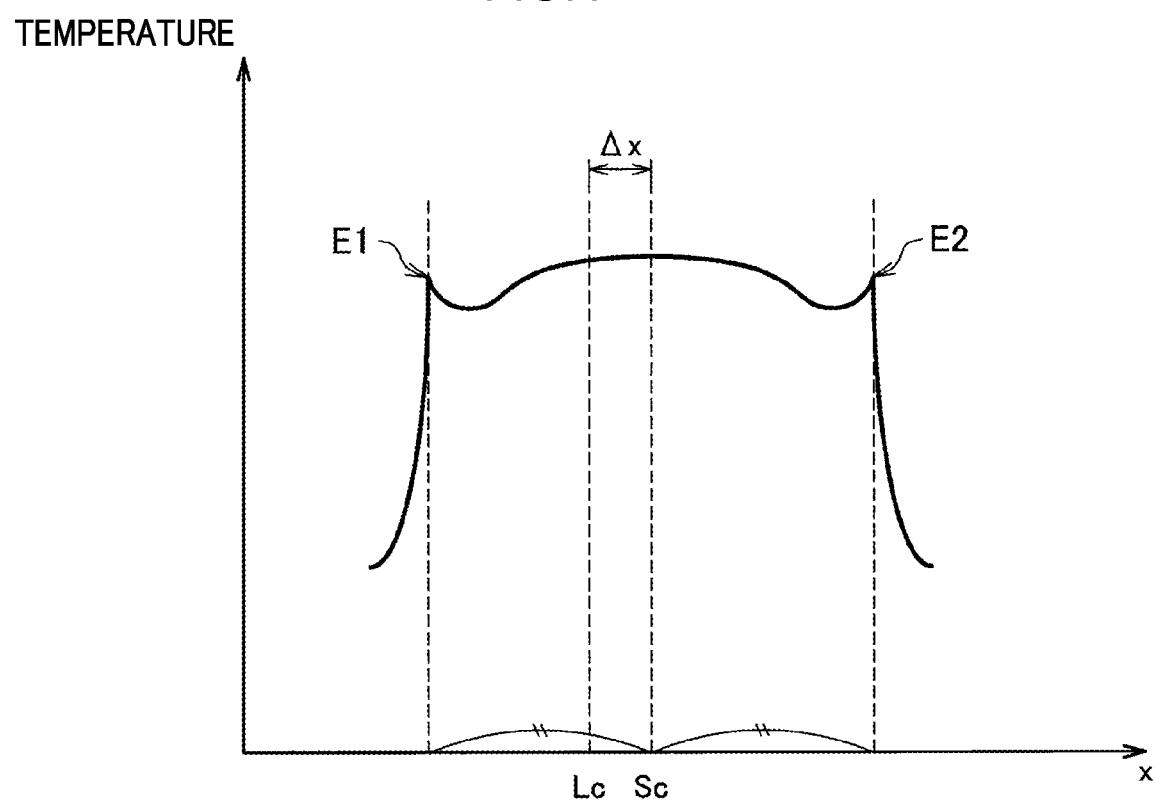

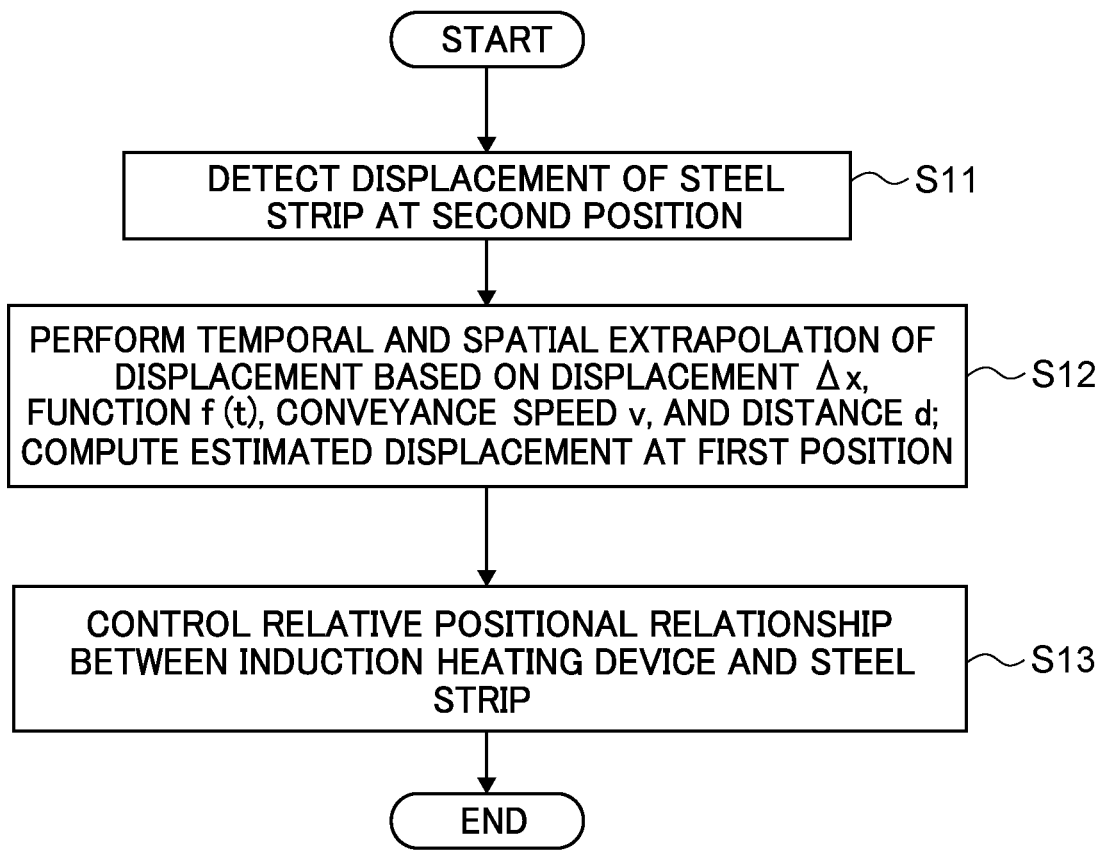

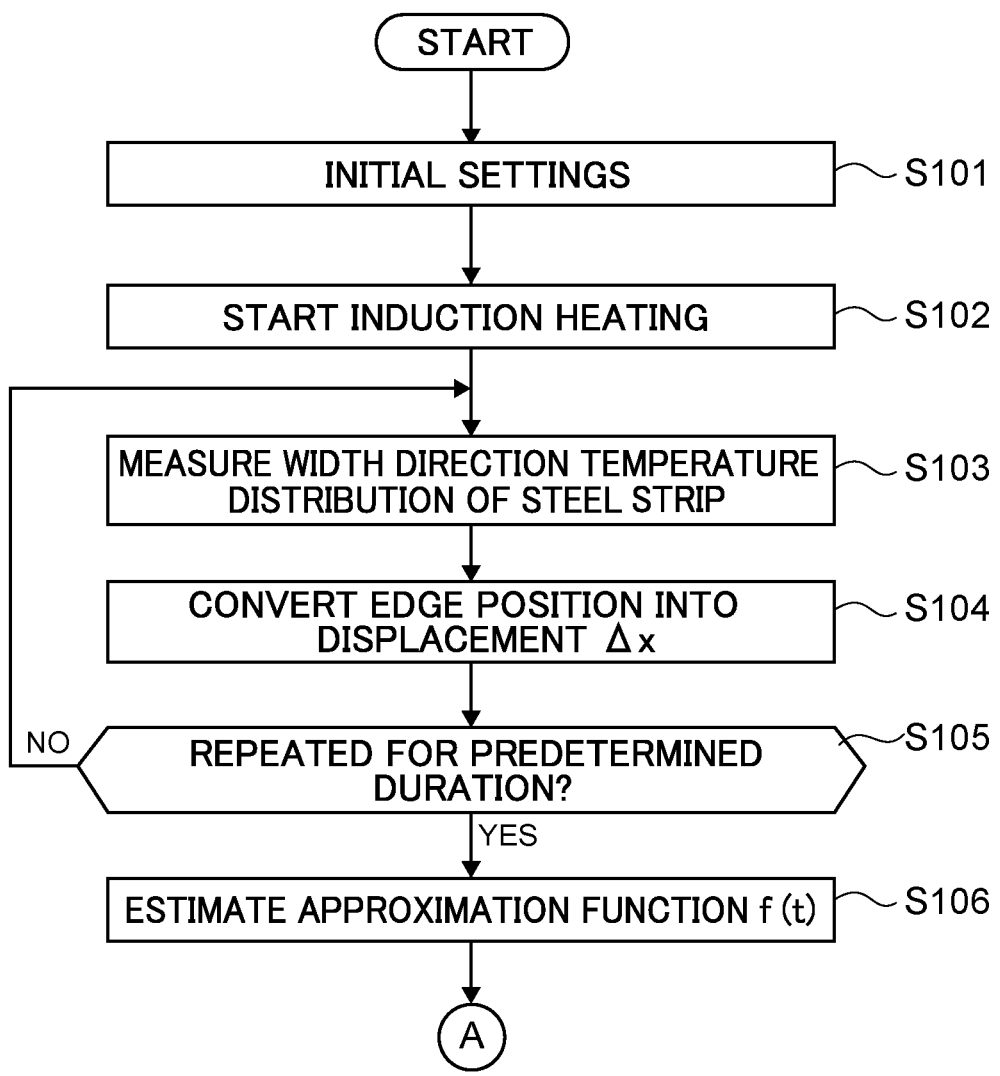

METAL STRIP INDUCTION HEATING METHOD AND INDUCTION HEATING APPARATUS

TECHNICAL FIELD

The present invention relates to an induction heating method and an induction heating apparatus for a metal strip moving in a length direction. In particular, the present invention relates to an induction heating method and an induction heating apparatus for a metal strip that are capable of suppressing overheating at width direction edges of the metal strip so as to heat the metal strip uniformly, and that are also capable of responding immediately to fluctuations in the position of strip edges due to meandering or the like.

BACKGROUND ART

Induction heating is a heating method utilizing the principles of electromagnetic induction to generate eddy currents in a heated object and to heat the target by joule heating. Induction heating is widely employed due to its low heat loss and high efficiency. Two main methods are employed in induction heating of metal strips. One method is longitudinal flux (LF) induction heating (referred to hereafter as LF method), in which a high frequency current flows through an induction coil wrapped in the width direction around the periphery of a metal strip, and causing magnetic flux to pass through the metal strip in its length direction, such that circling induced currents enclosed within width direction cross-sections of the metal strip are generated by the magnetic flux so as to heat the metal strip. Another method is transverse flux (TF) induction heating (referred to hereafter as TF methods), in which a metal strip is disposed between induction coils (good conductors) each wound into a primary coil. Current flowing through the primary coils results in generated magnetic flux passing through the plane of the metal strip so as to generate induced currents in the plane of the metal strip and thereby heat the metal strip.

Generally, there are a number of problems with induction heating using LF methods resulting from the relationship between the current skin depth $\delta$ and the current frequency f ($\delta$ (mm)=$5.03 \times 10^5 \sqrt{(\rho/\mu r \cdot f)}$, wherein $\rho$ ($\Omega$m) is specific resistance, $\mu r$ is relative permeability, and f is frequency (Hz)). For example, in cases in which the thickness of the metal strip is thin, there is an issue that the current frequency f has to be increased or else induced currents will not be generated. For a non-magnetic metal strip or a metal strip having magnetic properties at room temperature exceeding its Curie temperature, there is an issue that the current skin depth $\delta$ increases such that an induced current is not generated if the thickness of the metal strip is thin. On the other hand, induction heating using TF methods is not dependent on strip thickness, and both magnetic and non-magnetic metal strips can be heated alike. However, with TF methods there is an issue that if the opposing induction coils are not close to each other, the heating efficiency is low, and overheating also occurs in edges of the metal strip, making uniform heating of the metal strip in the width direction difficult to achieve.

In consideration of such pros and cons of induction heating methods, Patent Document 1 describes technology relating to TF methods, and Patent Document 2 describes technology exhibiting characteristics of both LF methods and TF methods as examples of technology to enable heating temperature distribution to be controlled over the entire width, including edges of a metal strip, irrespective of its magnetic or non-magnetic properties.

For example, Patent Document 1 describes technology in which plural independent magnetic cores (magnetic rods) are placed at the back faces of TF method induction coils. This means that the positions of these magnetic cores can be modified according to the width of the metal strip, and use in conjunction with electromagnetic shielding plates (screens) enables a uniform temperature to be obtained in the width direction of the metal strip.

Patent Document 2 describes technology in which, instead of employing multiple induction coil windings wrapped around the metal strip in the width direction as in LF methods, employs two or more sets of induction coils that are sets of single-winding induction coils wrapped around each of the front face and back face of the metal strip, at positions shifted from each other along the length direction of the metal strip. An induced current is thus generated that circulates in the plane of the metal strip as in TF methods. Patent Document 2 also describes technology to avoid overheating at the width direction edges of the metal strip by shaping the induction coils so as to be tilted toward the width direction edges, combining with magnetic cores, and moving the induction coils in the width direction.

Patent Document 3, for example, describes technology in which such induction heating is employed to heat a moving metal strip.

Patent Document 3 describes technology in which non-magnetic rolls having insulators on their surfaces are arranged to the front and rear of an induction heating device (inductor) with respect to the direction of progress of a moving metal strip (strip shaped metal material) in order to restrict the pass line and control meandering. This enables stable heating to be performed in which even magnetic materials are not attracted toward the inductor, and enables meandering to be controlled so as to prevent an increase in heating temperature deviation.

The technology described in Patent Document 3 employs a position detection device provided either upstream or downstream of the induction heating device to detect a width direction position of the metal strip. A roll wound with the metal strip is moved based on this detected width direction position. The width direction positional relationship between the metal strip and the induction heating device is thus controlled to within a given range.

Patent Documents 4 to 6 also describe other examples of technology to control the width direction positional relationship between a metal strip and an induction heating device in order to suppress meandering in the metal strip.

Patent Document 4 describes detecting a width direction center line of a metal strip (strip), so as to detect a misalignment amount from a correct position that is the position of the center line. Patent Document 4 also describes technology to control the position of an induction heating device (electromagnetic device) according to a misalignment amount of the center line or an edge of the metal strip with control that follows the misalignment.

Patent Document 5 describes moving an induction heating device (conductor coils) opposing a metal strip (metal sheet) by horizontal to and fro movement with a predetermined period and amplitude in a width direction of the metal strip. For example, Patent Document 5 describes technology causing the amplitude center of the conductor coils to move so as to follow a center line of a continuous moving metal strip whose position changes in a sheet width direction.

Patent Document 6 describes technology in which a detector detects the amount of width direction movement of a metal strip (flat sheet), and controls movement of the coils of an induction heating device (induction heating coil apparatus) in a width direction of the flat sheet based on a detection signal from the detector.

RELATED DOCUMENTS

Patent Documents

Patent Document 1: Japanese Patent Application Laid-Open (JP-A) No. 2002-008838
Patent Document 2: JP-A No. 2008-288200
Patent Document 3: JP-A No. H11-251048
Patent Document 4: JP-A No. 2001-006866
Patent Document 5: Japanese Patent Application Publication No. H6-037676
Patent Document 6: Japanese Utility Model Application Laid-Open No. H6-022950

SUMMARY OF INVENTION

Technical Problem

In Patent Document 3, although the position detection device may be provided either upstream or downstream of the induction heating device, FIG. 1 and FIG. 4 etc. thereof actually only disclose an example in which the position detection device is disposed upstream of the induction heating device. Accordingly, for example, there are no countermeasures presented to the problem of cases in which a position detection device must be disposed downstream of the induction heating device, such as cases in which an exit side of a molten plating device is unsuited to sensor installation due to the presence of high temperature metal fumes. Namely, in cases in which a position detection device is disposed downstream of the induction heating device, the width direction position of the metal strip is only known after the metal strip has passed through the induction heating device. This means that it is not always easy to appropriately control the width direction positional relationship between the metal strip and the induction heating device while the metal strip is passing through the induction heating device.

On the other hand, in cases in which the metal strip induction heating method applied is the TF method described in Patent Document 1 or the induction heating method described in Patent Document 2, high precision control is demanded for the width direction positional relationship between the metal strip and the induction heating device. Such induction heating methods (excluding induction heating method employing solenoid coils) are highly sensitive to the accuracy of the temperature at both width direction edges of the metal strip and so high precision control is required. Accordingly, even in cases in which the position detection device is disposed upstream of the induction heating device, due to the distance between the position detection device and the induction heating device, it is not always easy to control the width direction positional relationship between the metal strip and the induction heating device with sufficient precision while the metal strip is passing through the induction heating device.

Moreover, it is not always easy to control the positional relationship between the metal strip and the induction heating device using general PID control based on the position of the metal strip as detected by a position detection device as described in Patent Documents 3 to 6. In such control, in cases in which complex meandering occurs as a result of various factors that might affect metal strip meandering (for example material properties of the metal strip, temperature distribution, tension distribution, or metal strip shape (strip thickness, strip width, or the presence or absence of sheet joints)), it is difficult to respond to complex meandering by simple following based on detection results as described in Patent Documents 3 to 6.

Accordingly, an object of the present invention is to provide a novel and improved induction heating method and induction heating apparatus for a metal strip that are capable of high precision control of a positional relationship between an induction heating device and a metal strip, while minimizing constraints on device placement when performing induction heating of a continuously conveyed metal strip.

Solution to Problem

An aspect of the present invention is to provide an induction heating method for a metal strip, employed to heat a continuously conveyed metal strip using an induction heating device disposed at a first position on a pass line. The induction heating method includes a step of detecting a displacement from a predetermined datum line of a width direction center line of the metal strip at a second position on the pass line that is different from the first position, a step of computing an estimated displacement of the width direction center line of the metal strip at the first position by temporal and spatial extrapolation of the displacement based on a function expressing a time series of changes in the displacement, and a step of controlling a relative positional relationship between the induction heating device and the metal strip in a width direction of the metal strip based on the estimated displacement.

In the above configuration, the estimated displacement of the width direction center line of the metal strip can be computed, by temporal and spatial extrapolation of the displacement of the width direction center line of the metal strip from the width direction center line of the pass line, in a similar manner for both when the position to detect this displacement is downstream of the induction heating device and when upstream thereof. This accordingly means that a device to detect the displacement may be disposed either upstream of the induction heating device or downstream thereof, with this point minimizing restrictions to device placement. Moreover, by employing the estimated displacement at the position of the induction heating device, the positional relationship between the induction heating device and the metal strip can be controlled at high precision.

In the above induction heating method for a metal strip, the second position may be a position downstream of the first position.

In the above induction heating method for a metal strip, the second position may be a position upstream of the first position.

In the above induction heating method for a metal strip, the step of detecting the displacement may include a step of measuring a temperature distribution in a range including at least one width direction edge of the metal strip at the second position, and a step of converting a position of a width direction edge of the metal strip, as apparent from a sudden temperature drop in the temperature distribution, into the displacement.

In the above induction heating method for a metal strip, the step of computing the estimated displacement may include a step of converting the time series of changes in the displacement into the function, and a step of computing the estimated displacement at a first time based on a conveyance speed of the metal strip, a distance between the first position and the second position, the function, and the displacement at the first time.

In such cases, the above induction heating method for a metal strip may further include a step of updating the function based on a result of comparing the displacement at a second time later than the first time against the estimated displacement computed based on the displacement at the first time.

Moreover, in such cases, the above induction heating method for a metal strip may further include a step of applying an external force to the metal strip to suppress displacement in the width direction of the metal strip according to a trend in the function.

In the above induction heating method for a metal strip, the step of controlling the relative positional relationship may include a step of moving the induction heating device and/or a part of the induction heating device in a width direction of the metal strip.

Another aspect of the present invention provides an induction heating apparatus for a metal strip including an induction heating device disposed at a first position on a pass line of a continuously conveyed metal strip. The induction heating apparatus includes a detection section configured to detect a displacement from a predetermined datum line of a width direction center line of the metal strip at a second position on the pass line that is different from the first position, an estimated displacement computation section configured to compute an estimated displacement of the width direction center line of the metal strip at the first position by temporal and spatial extrapolation of the displacement based on a function expressing a time series of changes in the displacement, and a relative position control section configured to control a relative positional relationship between the induction heating device and the metal strip in a width direction of the metal strip based on the estimated displacement.

In the above metal strip induction heating apparatus, the second position may be a position downstream of the first position.

In the above metal strip induction heating apparatus, the second position may be a position upstream of the first position.

In the above metal strip induction heating apparatus, the detection section may be configured to measure a temperature distribution in a range including at least one width direction edge of the metal strip at the second position, and to convert a position of a width direction edge of the metal strip, as apparent from a sudden temperature drop in the temperature distribution, into the displacement.

In the above metal strip induction heating apparatus, the estimated displacement computation section may include a function to convert the time series of changes in the displacement into the function, and may compute the estimated displacement at a first time based on a conveyance speed of the metal strip, a distance between the first position and the second position, the function, and the displacement at the first time.

In such cases, the estimated displacement computation section may be further configured to update the function based on a result of comparing the displacement at a second time later than the first time against the estimated displacement computed based on the displacement at the first time.

In such cases, the above metal strip induction heating apparatus may further include an external force application section configured to apply an external force to the metal strip to suppress displacement in the width direction of the metal strip according to a trend in the function.

In the above metal strip induction heating apparatus, the induction heating device may include an actuator configured to move the induction heating device in a width direction of the metal strip and/or an actuator configured to move a part of the induction heating device in the width direction of the metal strip, and the relative position control section may be configured to transmit a control signal to the respective actuator.

Advantageous Effects

As described above, the present invention enables the positional relationship between the induction heating device and the metal strip to be controlled with high precision while minimizing restrictions to device placement when performing induction heating on a continuously conveyed metal strip.

BRIEF DESCRIPTION OF DRAWINGS

FIG. 4 is a graph illustrating an example of a temperature distribution as measured by the temperature scanner illustrated in FIG. 2.

FIG. 6 is a flowchart illustrating an example of processes of an induction heating method according to the first exemplary embodiment of the present invention.

FIG. 7A is a flowchart illustrating a specific example of a process of an induction heating method according to the first exemplary embodiment of the present invention.

DESCRIPTION OF EMBODIMENTS

Figure 1:
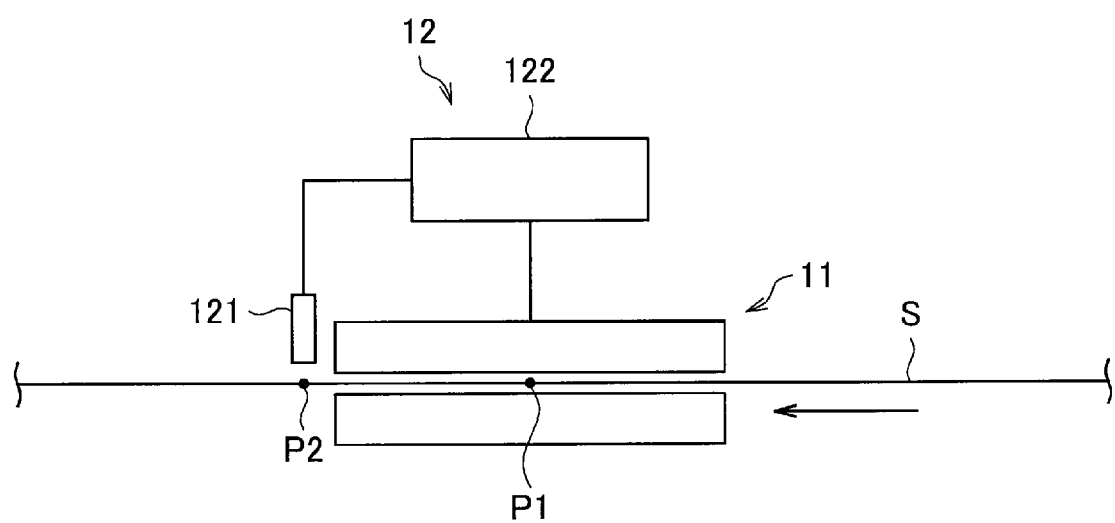
FIG. 1 is a side view illustrating a schematic configuration of an induction heating apparatus according to a first exemplary embodiment of the present invention.

Detailed explanation follows regarding preferable exemplary embodiments of the present invention with reference to the attached drawings. Configuration elements having essentially the same functional configuration are allocated the same reference numerals in the present specification and drawings, and duplicate explanation thereof is omitted.

First Exemplary Embodiment

FIG. 1 is a side view illustrating a schematic configuration of an induction heating apparatus 10 according to a first exemplary embodiment of the present invention. As illustrated in FIG. 1, the induction heating apparatus 10 includes an induction heating device 11 and a control device 12. The induction heating device 11 is a TF method induction heating device for heating a continuously conveyed steel strip S, and is disposed at a position P1 on a pass line of the steel strip S. Note that the steel strip S is an example of a metal strip of the present exemplary embodiment. The control device 12 includes a temperature scanner 121 serving as an example of a sensor, and a computation device 122. The temperature scanner 121 is disposed at a position P2 on the pass line of the steel strip S, this being a different position to the position P1 in a conveyance direction. In the following explanation, upstream and downstream are defined in terms of a direction of flow of the steel strip S being conveyed on the pass line of the steel strip S. Based on this definition, the position P2 of the temperature scanner 121 is downstream of the position P1 of the induction heating device 11 on the pass line of the steel strip S.

The computation device 122 performs various computation and control in the induction heating apparatus 10. The computation device 122 implements some or all of the functionality of a detection section, an estimated displacement computation section, and a relative position control section, each described later.

Note that although the steel strip S is illustrated as being conveyed in a horizontal direction in FIG. 1, this illustration does not limit the placement of the metal strip in the exemplary embodiments of the present invention. The metal strip may be conveyed in a vertical direction in another exemplary embodiment.

Figure 2:
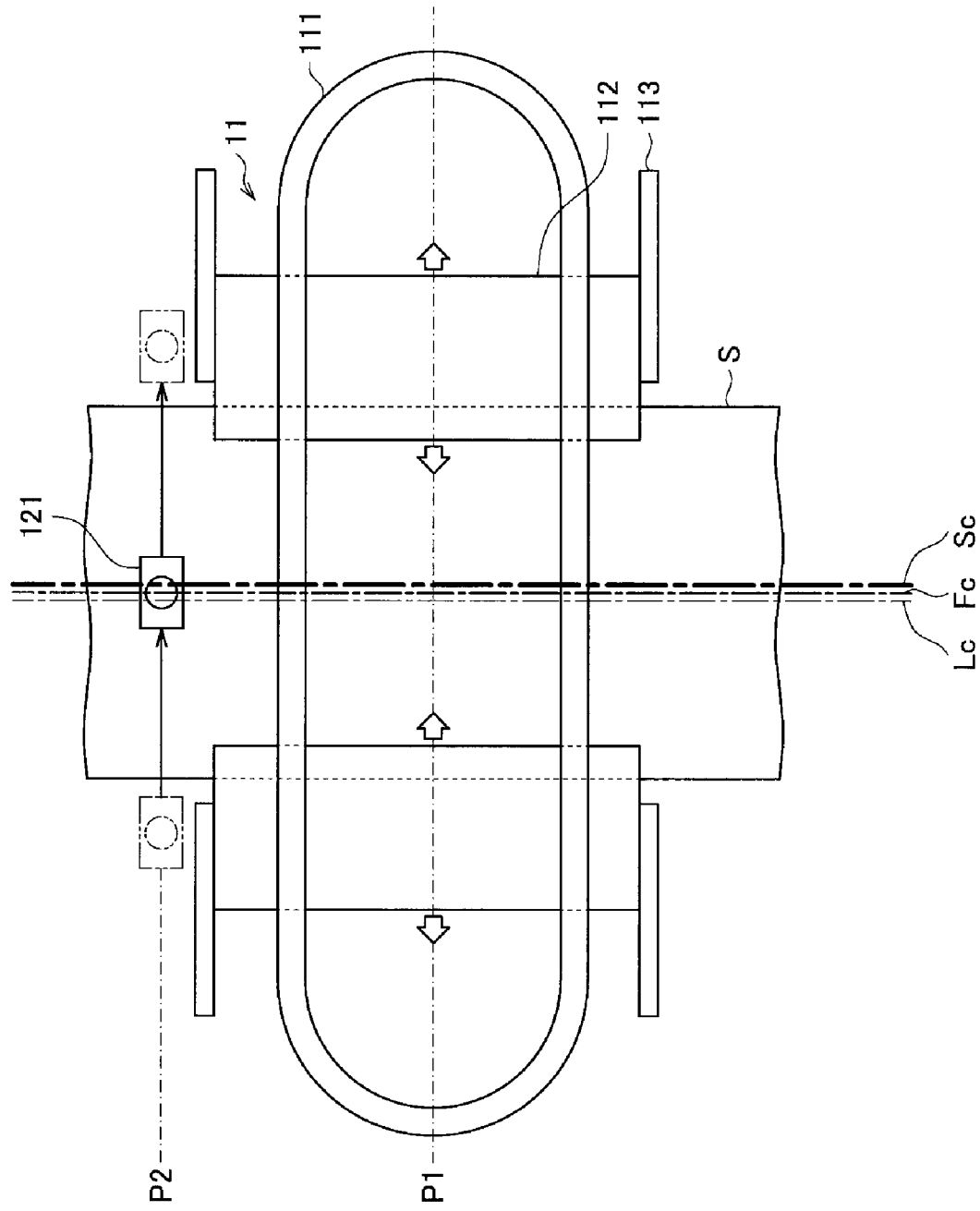
FIG. 2 is a diagram illustrating an example of placement of a temperature scanner and an induction heating device employing electromagnetic shielding plates in the induction heating apparatus illustrated in FIG. 1.

FIG. 2 is a plan view illustrating an example of placement of the temperature scanner 121 and the induction heating device 11 employing electromagnetic shielding plates 112 employed in the induction heating apparatus 10 illustrated in FIG. 1. As illustrated in FIG. 2, the induction heating device 11 includes induction coils 111, the electromagnetic shielding plates 112, and actuators 113 configured to move the electromagnetic shielding plates 112 in the width direction of the steel strip S, indicated by arrows in the drawing. The electromagnetic shielding plates 112 provide local shielding at both width direction edges of the steel strip S from magnetic flux generated by the induction coils 111. The actuators 113 are connected to the computation device 122 included in the control device 12 illustrated in FIG. 1, and are configured to move the electromagnetic shielding plate 112 according to control signals transmitted by the computation device 122. Each of the electromagnetic shielding plates 112 blocks magnetic flux due to being disposed at a correct position with respect to the steel strip S, specifically due to being disposed at a position so as to cover an appropriate width of the steel strip S from a width direction edge, and is capable of preventing overheating that might arise from high eddy current density at the width direction edges of the steel strip S. Note that details will be described later regarding control to move the electromagnetic shielding plates 112 so as to be disposed at the correct positions using the actuators 113.

The temperature scanner 121 is an example of a sensor to measure the temperature distribution in a range including the steel strip S at the position P2. In the illustrated example, the temperature scanner 121 measures the temperature with a single sensor while moving in the width direction of the steel strip S. As an alternative example, the temperature scanner 121 may be fixed above a width direction center line position of the pass line, with a sensor inbuilt into casing of the temperature scanner 121, which is configured so as to oscillate to change an angle in the width direction as required so as to measure the entire width direction. In the illustrated example, a range over which the temperature distribution is measured with the temperature scanner 121 includes both width direction edges of the steel strip S. As an alternative example, a range over which the temperature distribution is measured with the temperature scanner 121 may be configured so as to include only one width direction edge of the steel strip S, in consideration of the width direction symmetry.

The temperature scanner 121 may be fixed independently to the induction heating device 11. In such cases, the temperature scanner 121 may measure the temperature of the steel strip S irrespective of movement of the induction heating device 11. Fixing the temperature scanner 121 independently of the induction heating device 11 reduces noise due to the effects of vibration etc. from the induction heating device 11. This improves the detection precision of the temperature scanner 121. Moreover, the temperature scanner 121 may be provided at a position separated from the induction heating device 11 by a predetermined distance. In such cases, the temperature scanner 121 may measure the temperature of the steel strip S irrespective of movement and of the installation position of the induction heating device 11. By providing the temperature scanner 121 separated from the induction heating device 11, noise due to the effects of vibration, magnetic fields, and the like from the induction heating device 11 is reduced. This improves the detection precision of the temperature scanner 121. Note that the distance between the temperature scanner 121 and the induction heating device 11 is not particularly limited, and may be any distance such that the estimation of displacement at the second position P2, described later, is not affected.

Figure 3A:
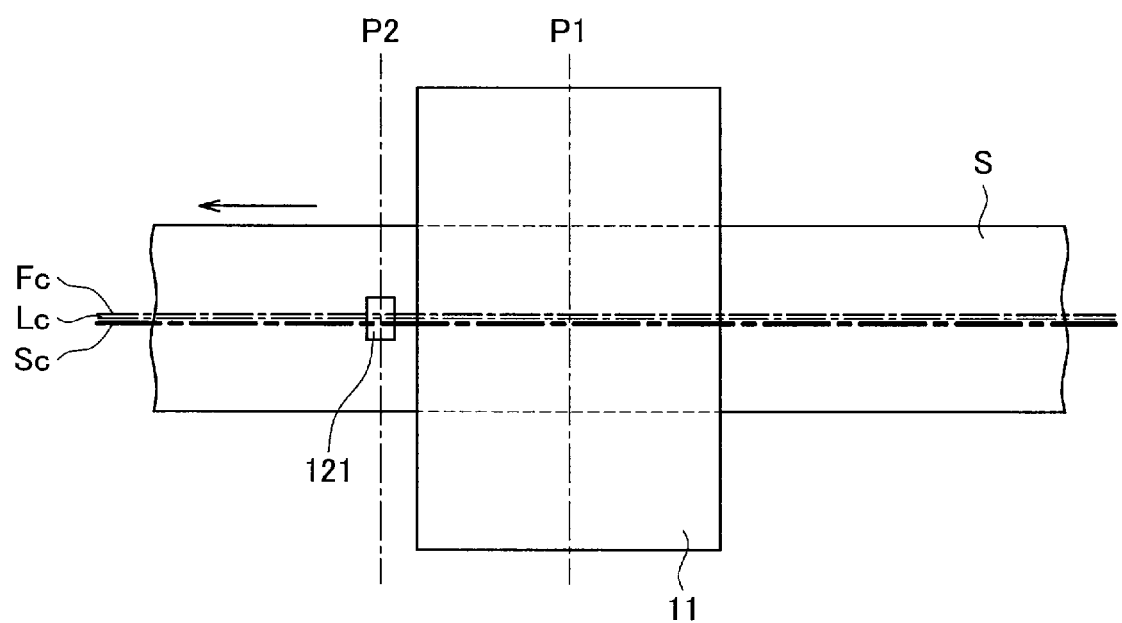
FIG. 3A is a plan view to explain a state in which a width direction center line Lc of a pass line, a width direction center line Fc of an induction heating device, and a width direction center line Sc of a steel strip S are aligned with each other in an induction heating apparatus according to the first exemplary embodiment of the present invention.
Figure 3B:
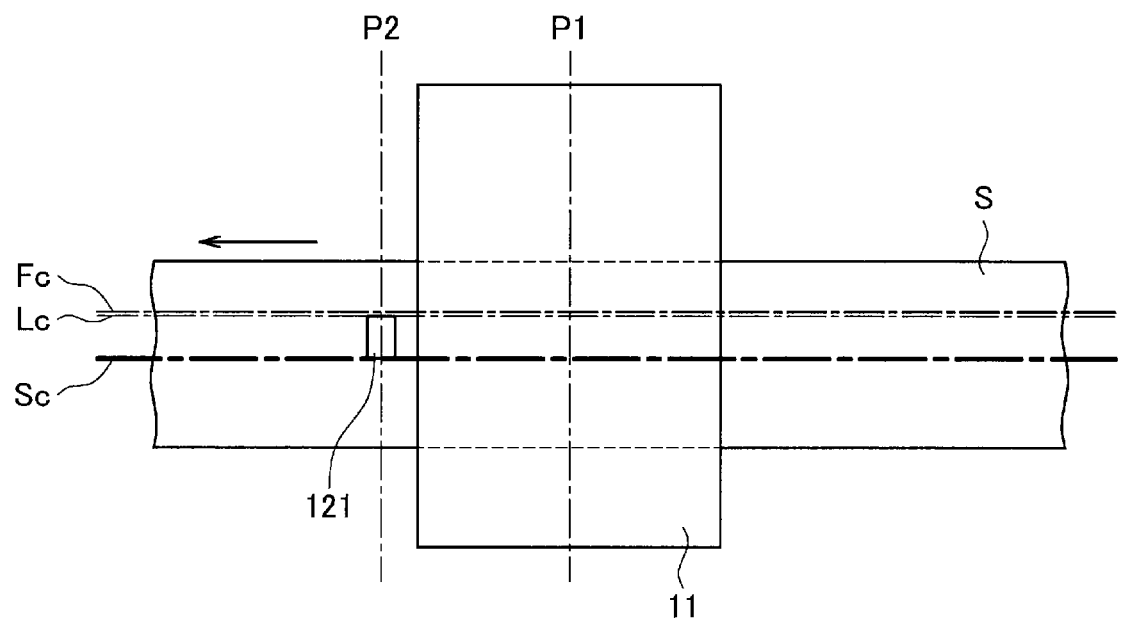
FIG. 3B is a plan view to explain a state in which the width direction center line Sc of the steel strip S has deviated from the state illustrated in FIG. 3A.

FIG. 2 illustrates a design width direction center line Lc of the pass line (the fine line in FIG. 2), a width direction center line Fc of the induction heating device 11 (the medium line in FIG. 2), and a width direction center line Sc of the steel strip S (the bold line in FIG. 2). The width direction center lines are each a line extending in a direction orthogonal to the width direction and, in plan view, passing through respective width direction length center points of the pass line, the induction heating device 11, and the steel strip S. As illustrated in FIG. 2 and FIG. 3A, the induction heating device 11 is designed such that the width direction center lines Lc, Fc, Sc are in an aligned state with each other in an ideal state. However, in reality, as illustrated in FIG. 3B, meandering of the steel strip S causes the width direction center line Sc of the steel strip S to deviate from the width direction center line Lc of the pass line and the width direction center line Fc of the induction heating device 11. When this occurs, an issue arises in that each of the electromagnetic shielding plates 112 illustrated in FIG. 2 is no longer disposed at the correct position relative to the steel strip S. Specifically, for example, overheating occurs if the width covered by the electromagnetic shielding plate 112 at one width direction edge of the steel strip S decreases, or the edge is no longer covered by the electromagnetic shielding plate 112, whereas heating is insufficient at the other edge due to the width covered by the corresponding electromagnetic shielding plate 112 increasing. As described above, moving the electromagnetic shielding plates 112 as illustrated in FIG. 2 enables the electromagnetic shielding plates 112 to be maintained at the correct positions relative to the steel strip S even in cases in which the width direction center line Sc of the steel strip S has deviated as illustrated in FIG. 3B, for example, thereby enabling overheating and insufficient heating to be prevented.

Normally, the center line Sc of the steel strip S and the center line Fc of the induction heating device 11 are set so as to be aligned with a predetermined datum line. Note that the center line Lc of the designed pass line is an example of a predetermined datum line. However, the profiles of in-furnace rolls inside a heat treatment furnace are changed by non-constant shifts in the furnace temperature of the heating furnace and in the sheet steel temperature. Accompanying this, a contact state between the steel strip S and the in-furnace rolls also varies, changing the tension distribution within the steel strip S. A tension distribution also arises within the steel strip S from heating and cooling processes. This often results in the center line Sc of the steel strip S deviating from the center line Lc of the pass line. The center line Fc of the induction heating device 11 deviates from the center line Sc of the steel strip S as a result.

In cases in which the induction heating device 11 employs a TF method, since the position where the magnetic flux is concentrated has a significant effect on the heating temperature distribution of the steel strip S, the center line Sc of the steel strip S needs to be aligned as closely as possible with the center line Fc of the induction heating device at all times in order to obtain the desired heating temperature distribution. In order to perform such alignment, movement of the induction heating device 11 may be controlled so as to align the center line Sc of the steel strip S with the center line Fc of the induction heating device 11 by predicting the position of the center line Sc of the steel strip S in advance, or, in cases in which a meandering control device is provided for the steel strip S, the meandering of the steel strip S may be controlled such that the center line Sc of the steel strip S corresponds to the center line Fc of the induction heating device 11 at all times.

The inventors have carefully measured the way in which a steel strip S meanders in order to research control of the induction heating apparatus 10 so as to accommodate meandering of the steel strip S. As a result of performing such measurements the inventors have discovered that meandering of the steel strip S often includes a periodic component. Furthermore, the inventors have focused on the fact that meandering can be expressed using various functions, including periodic functions with a long periodicity and a short periodicity, and thereby arrived at the idea of utilizing such functions to control the induction heating apparatus 10 in a manner enabling meandering of the steel strip S to be accommodated.

Figure 5A:
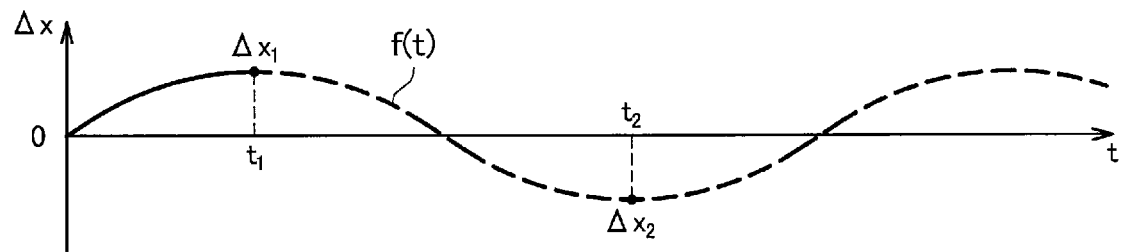
FIG. 5A is a diagram to explain a computation method to compute an estimated displacement in the width direction of a metal strip in the first exemplary embodiment of the present invention.
Figure 5B:
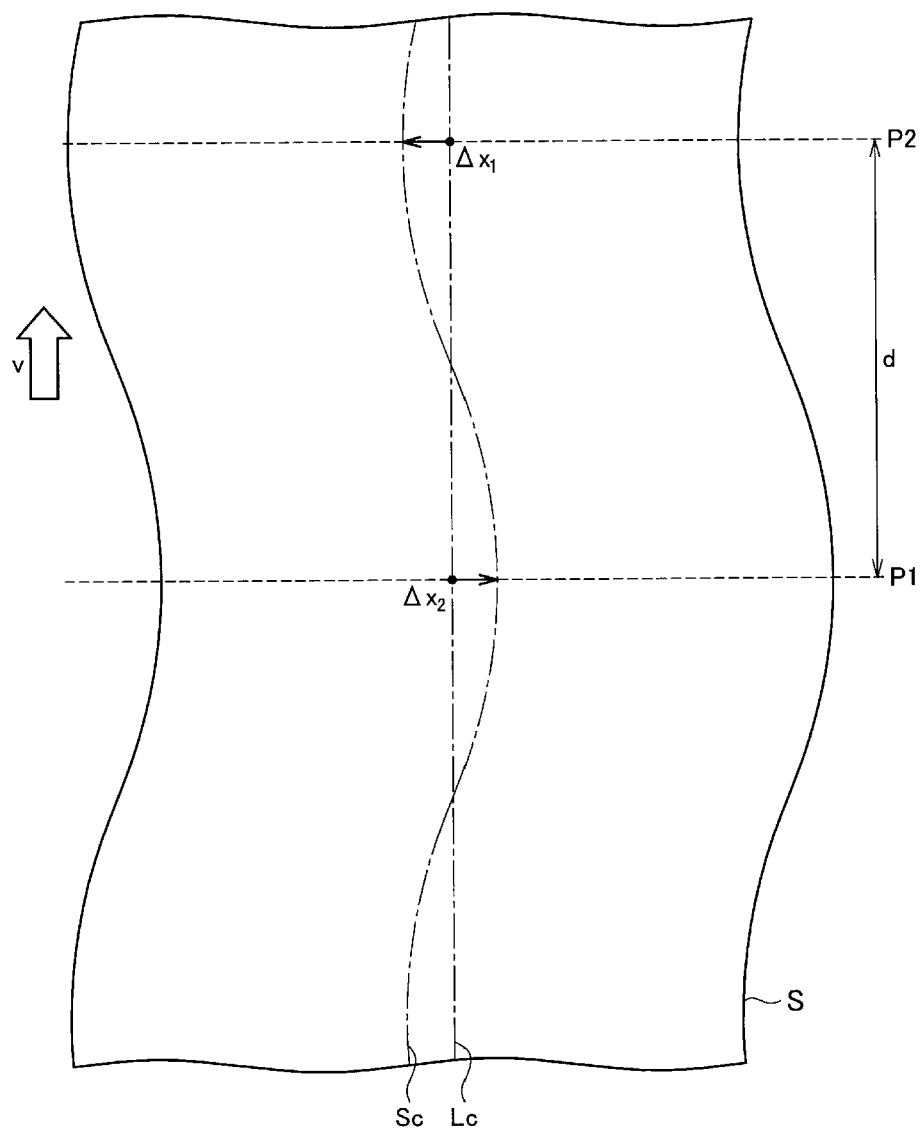
FIG. 5B is a diagram to explain a computation method to compute an estimated displacement in the width direction of a metal strip in the first exemplary embodiment of the present invention.

Further explanation follows regarding positioning control of the electromagnetic shielding plates 112 of the induction heating device 11 according to the present exemplary embodiment, with reference to FIG. 4, FIG. 5A and FIG. 5B. FIG. 4 is a graph illustrating an example of a temperature distribution as measured by the temperature scanner illustrated in FIG. 2. As illustrated in FIG. 4, in the induction heating apparatus 10 the steel strip S is at a high temperature after undergoing heating in the induction heating device 11. However, when the atmospheric temperature is room temperature, or a cooled copper plate or the like is installed at a back face of the steel strip S, then edges E1, E2 are apparent from sudden temperature drops in the temperature distribution, corresponding to the two edges of the steel strip S in the width direction (represented by the x axis in the graph of FIG. 4). The computation device 122 converts the positions of the edges E1, E2 to a displacement $\Delta x$ of the steel strip S from the design width direction center line of the width direction center line Sc.

More specifically, the computation device 122 serves as a detection section to identify the width direction center line Sc of the steel strip S as a center point position between the width direction edges E1, E2 of the steel strip S, and repeatedly computes the displacement $\Delta x$ as the positional difference between the width direction center line Sc of the steel strip S and the width direction center line Lc of the pass line. In this example, the predetermined datum line is the width direction center line Lc of the pass line (also aligned with the width direction center line Fc of the induction heating device 11). The width direction center line Lc of the pass line is also at the center position of a measurement range of the temperature scanner 121.

In cases in which, for example, the width direction center line Lc of the pass line is not aligned with the width direction center line Fc of the induction heating device 11, the width direction center line Fc of the induction heating device 11 may be employed as the predetermined datum line. In such an example, the computation device 122 serves as the detection section and repeatedly computes the displacement $\Delta x$ as the positional difference between the width direction center line Sc of the steel strip S and the width direction center line Fc of the induction heating device 11.

As another example, the computation device 122 may be configured to compute the displacement $\Delta x$ by comparing the positions of the edges E1, E2 against datum edge positions of the steel strip S. To compute the displacement $\Delta x$ in such cases, information regarding the datum edge positions of the steel strip S, and more specifically information regarding the width of the steel strip S in addition to the width direction center line Lc of the pass line, is required. However, the range over which the temperature distribution is measured by the temperature scanner 121 may be configured to include only a single width direction edge of the steel strip S.

FIG. 5A and FIG. 5B are diagrams to explain a method to compute the estimated displacement in the width direction of the steel strip of the first exemplary embodiment of the present invention. As illustrated in FIG. 5A, the computation device 122 successively accumulates displacements $\Delta x$ ($\Delta x$, $\Delta x+1$, $\Delta x+2$, ... ) in the width direction of the steel strip S at each time t, and finds an approximation function f(t) for a time series of changes in the displacement $\Delta x$ using a time series analysis method or a function approximation method or the like. The method employed for such conversion is not particularly limited, and may, for example, be approximation by trigonometric function so as to minimize error when there is periodicity present. Periodicity often occurs in the time series of changes in the width direction displacement $\Delta x$ of the steel strip S, namely in the meandering of the steel strip S. Accordingly, the approximation function f(t) can be found comparatively easily by accumulating displacements $\Delta x$ over a comparatively short period of time. If the approximation function f(t) can be estimated then this enables a displacement $\Delta x2$ at a given length direction position of the steel strip S, specifically at a future time t2 to be predicted using a displacement $\Delta x1$ at a given time t1. Moreover, if the approximation function f(t) can be estimated then this also enables a displacement $\Delta x2$ at a given length direction position of the steel strip S at a past time t3 to be predicted from a displacement $\Delta x1$ at a time t1. Further explanation follows regarding estimation of the displacement $\Delta x2$ at a given length direction position at the current or a past time using the approximation function f(t).

As illustrated in FIG. 5B, based on a width direction displacement $\Delta x1$ of the steel strip S detected at time t1 at a downstream position P2, the computation device 122 computes an estimated displacement of the steel strip S at the upstream position P1 for the same time t1. Note that FIG. 5B illustrates the distance d between the position P1 and the position P2 in the conveyance direction, and the conveyance speed v of the steel strip S. The displacement $\Delta x2$ of the steel strip S arising at the upstream position P1 at time t1 should be observed at the downstream position P2 after elapse of a time (d/v) obtained by dividing the distance d by the conveyance speed v. Accordingly, if the time series of changes in $\Delta x$ as illustrated in FIG. 5A are expressed as t2=t1+d/v, then the displacement $\Delta x2$ at the downstream position P2 at the future time t2 is equivalent to the estimated displacement at the upstream position P1 at the current time t1.

Conversely, the displacement $\Delta x2$ of the steel strip S at the downstream position P1 at the current time t1 should be observed at the upstream position P2 at a time earlier by a time (d/v) obtained by dividing the distance d by the conveyance speed v. Accordingly, if the time series change in $\Delta x$ is expressed as t3=t1−d/v then the displacement $\Delta x2$ at the upstream position P2 at a past time t3 is equivalent to the estimated displacement at the downstream position P1 at the current time t1.

In this manner, the computation device 122 is capable of computing the estimated displacement in the width direction of the steel strip S at a position P1 that cannot be directly measured from the time series change in displacement $\Delta x$ at measurable position P2 either upstream or downstream of the induction heating device 11.

Note that the conveyance speed v may fluctuate during conveyance of the steel strip S. When this occurs, the computation device 122 may compute an average value from shifts in value of the conveyance speed v within a predetermined time as an average conveyance speed $v_{avg}$ to be employed in the above computation. Note that the shift in the conveyance speed v is detected by a line tachometer (not illustrated in the drawings) provided at a predetermined position on the pass line. The position where the line tachometer is provided is not particularly limited as long as it is a position where an average conveyance speed v can be detected. For example, the line tachometer may be provided in the vicinity of the second position P2 where the displacement is measured.

In this manner, in the present exemplary embodiment, the computation device 122 serving as an estimated displacement computation section computes the estimated displacement in the width direction of the steel strip S at the position P1 by temporal and spatial extrapolation of the width direction displacement $\Delta x$ of the steel strip S as detected at the position P2. Moreover, the computation device 122 serving as a relative position control section controls the relative positional relationship between the induction heating device 11 and the steel strip S at the position P1 based on the estimated displacement. Specifically, the computation device 122 transmits control signals to the actuators 113 illustrated in FIG. 2 based on the estimated displacement, and the actuators 113 move the electromagnetic shielding plates 112 according to the control signals.

Example of Processes of the First Exemplary Embodiment

FIG. 6 is a flowchart illustrating an example of processes of the induction heating method according to the first exemplary embodiment of the present invention described above. In the example illustrated in FIG. 6, the displacement $\Delta x1$ of the steel strip S at the second position P2 is first detected by the detection section (step S11). Specifically, the position of a width direction edge of the steel strip S is detected by the temperature scanner 121, and the computation device 122 computes the displacement $\Delta x$ of the steel strip S based on the conveyance speed v and the distance d between the first position P1 and the second position P2. Next, the computation device 122 serving as the estimated displacement computation section computes the estimated displacement $\Delta x2$ at the first position P1 by temporal and spatial extrapolation based on the approximation function f(t), the conveyance speed v, the distance d between the first position P1 and the second position P2, and the displacement $\Delta x$ (step S12). The approximation function f(t) employed here is a function expressing a time series change in the displacement $\Delta x$. Next, the relative positional relationship between the induction heating device 11 and the steel strip S is controlled based on the estimated displacement $\Delta x2$ at the first position P1 (step S13). Specifically, for example, an actuator 113 moves the induction heating device 11 to a predetermined position based on a control signal transmitted from the computation device 122 serving as the relative position control section.

Specific Example of Processes of the First Exemplary Embodiment

Figure 7B:
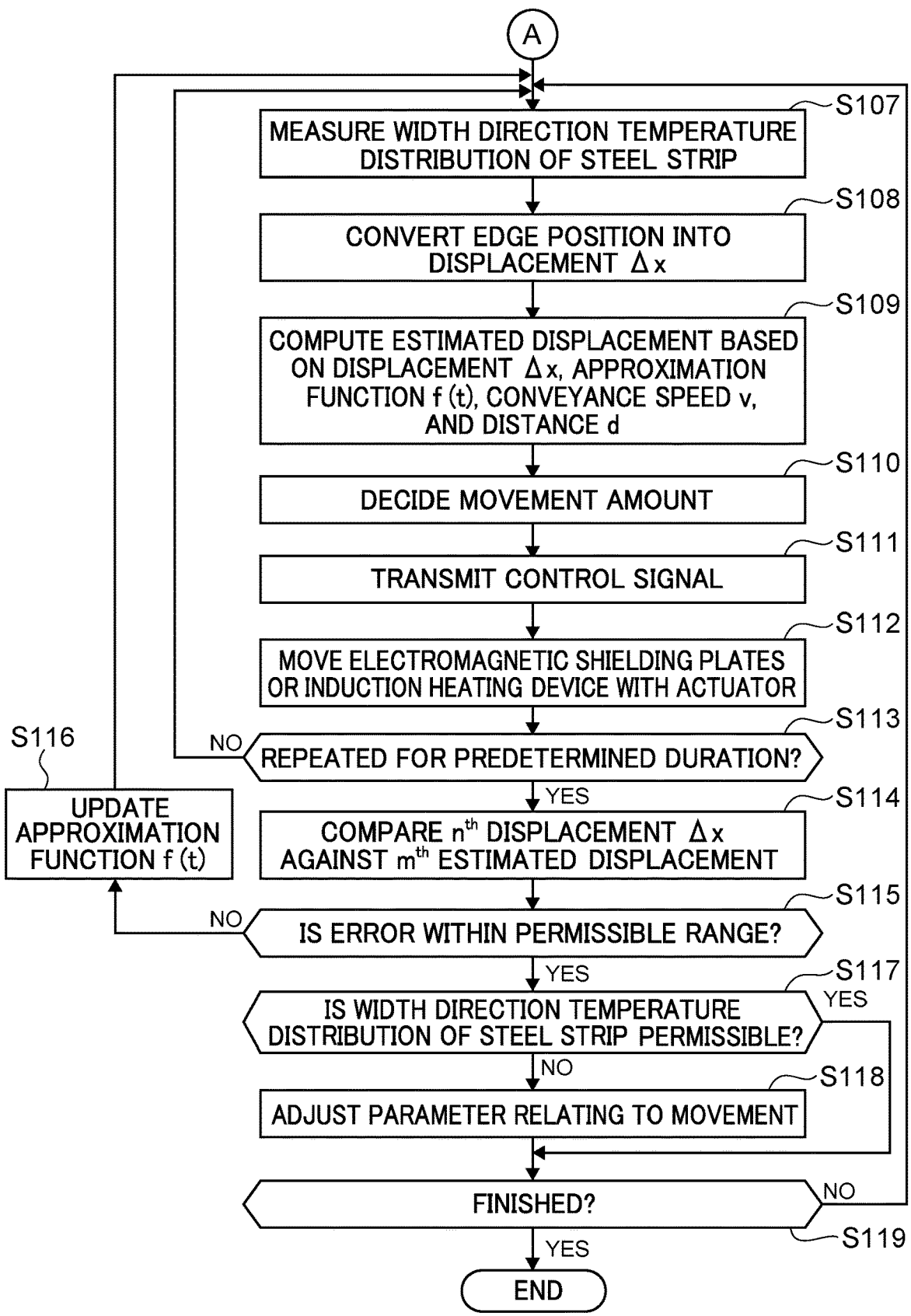
FIG. 7B is a flowchart illustrating a specific example of a process of an induction heating method according to the first exemplary embodiment of the present invention.

FIG. 7A and FIG. 7B are flowcharts illustrating specific examples of processes of the induction heating method according to the first exemplary embodiment of the present invention described above. In the example illustrated in FIG. 7A, initial settings are first implemented for the induction heating apparatus 10 (step S101). In the initial settings, the electromagnetic shielding plates 112 of the induction heating device 11 are disposed at an initial placement aligned to the width of the steel strip S. In the control device 12, an initial value is set in the computation device 122 for the distance d between the first position P1 and the second position P2 and the like. The distance d may, for example, be set to the conveyance direction distance between the electromagnetic shielding plates 112 and the temperature scanner 121. Conveyance of the steel strip S is then started using conveyance devices such as rolls (not illustrated in FIG. 1), a high frequency current is supplied to the induction coils 111, and induction heating of the steel strip S is started (step S102).

After starting the induction heating of the steel strip S, the temperature scanner 121 measures the width direction temperature distribution of the steel strip S in the vicinity of the induction heating device 11, for example at the downstream position P2 (step S103). Next, the computation device 122 converts positions of the edges E1, E2, as apparent from the temperature distribution, into a width direction displacement Δx of the steel strip S (step S104). After steps S103 and S104 have been repeated for a predetermined duration (step S105), the computation device 122 estimates the approximation function f(t) expressing the time series of changes in the displacement Δx (step S106). The method to estimate the approximation function is not particularly limited. For example, the approximation function may be estimated using a known mathematical approximation method. Note that the estimated approximation function may, for example, be a single trigonometric function or the like, or may be a combination of plural trigonometric functions having different periodicity and amplitudes.

As illustrated in FIG. 7B, after the approximation function f(t) has been estimated at step S106, the computation device 122 detects the displacement Δx based on the measurement results for temperature distribution similarly to at steps S103, S104 (steps S107, S108), and computes an estimated displacement of the steel strip S at the position P1 of the induction heating device 11 based on the displacement Δx, the approximation function f(t), the conveyance speed v, and the distance d between the first position P1 and the second position P2 (step S109). Moreover, based on the computed estimated displacement, the computation device 122 decides a movement amount to move the electromagnetic shielding plates 112 of the induction heating device 11, or the induction heating device 11 itself (step S110), and transmits a control signal corresponding to this movement amount to the actuators 113 (step S111). On receipt of the control signal, the actuators 113 act so as to move the electromagnetic shielding plates 112 or the induction heating device 11 (step S112).

The duration for repeating steps S107 to S112 differs depending on the approximation function, and so an appropriate duration may be determined by tuning.

After a predetermined duration has elapsed at step S113, the computation device 122 compares the displacement Δx detected on an $n^{th}$ repeat of steps S107, S108 in the repetition described above, against an estimated displacement computed for the $m^{th}$ (m<n) step S109 (step S114). On the $m^{th}$ step S109, the estimated displacement is computed based on the displacement Δx1 at the time t1. As explained with reference to FIG. 5A and FIG. 5B, the estimated displacement corresponds to the displacement Δx2 at the future time t2. Supposing that a displacement Δx2' for the time t2 has been detected at the $n^{th}$ steps S107, S108. If the approximation function f(t) employed to compute the displacement Δx2 at step S109 is appropriate, then the displacement Δx2 and the displacement Δx2' should agree, or more specifically the error between the displacement Δx2 and the displacement Δx2' should lie within a permissible range. The computation device 122 determines whether or not the error from the comparison at step S114 lies within the permissible range (step S115), and updates the approximation function f(t) when the error does not lie within the permissible range (step S116).

At step S116, for example the computation device 122 adjusts parameters of the approximation function f(t) such that both f (t1)=Δx1 and f (t2)=Δx2' (namely, Δx2=Δx2'). For example, as time series analysis, a regression line may be adopted as the approximation function in cases in which past data varies in a linear manner without major changes therefrom. Alternatively, approximation may be performed using a trigonometric function or the like in cases in which there are periodic variations due to tension variation or the like. Parameters of these functions may be adjusted in this manner. Moreover, a statistical model or the like may be employed for future predictions using the autocorrelation characteristics of past data, such as an autoregressive model (AR model) or an autoregressive moving average model (ARMA model), for cases in which a time series of changes in the displacement Δx is treated as a general time series data model. The parameters of the function in such models are adjusted. When this is being performed, the computation device 122 may add, to a dataset of the displacement Δx employed to estimate the approximation function f(t) at step S106 or to a dataset of the displacement Δx employed at a previously executed step S116, a dataset of the displacement Δx detected from the time t1 to the time t2. Alternatively, the computation device 122 may successively estimate the approximation function f(t) based on a dataset of the displacement Δx from the time t1 to the time t2 without regard to the approximation function f(t) up to that point in time. After the updating the approximation function f(t) at step S116, processing returns to step S107.

In cases in which the error was determined to be within the permissible range at step S115, the computation device 122 executes a determination as to whether or not control of the induction heating device 11 was valid based on the estimated displacement. Specifically, the computation device 122 determines whether or not the temperature distribution in the width direction of the steel strip S is permissible, as measured by the temperature scanner 121 at least once at step S107 in the repetitions of steps S107 to S112 described above (step S117). Unlike at step S104 and step S108 where the temperature distribution is employed to detect the displacement Δx, at step S117 the temperature distribution itself is evaluated. For example, the computation device 122 determines for the temperature deviation and the peak temperature in the width direction temperature distribution of the steel strip S whether or not they are within permissible ranges.

In cases in which the width direction temperature distribution of the steel strip S is determined not to be within the permissible range at step S117, the computation device 122 adjusts parameters related to movement of the electromagnetic shielding plates 112 or of the induction heating device 11 (step S118). Specifically, for example, the computation device 122 applies an offset to the position of the electromagnetic shielding plates 112 or to the position of the induction heating device 11, adjusts parameter such as a multiplier, a lag amount, or the like employed when moving the electromagnetic shielding plates 112 or the induction heating device 11 according to the estimated displacement.

Note that the movement amount of the electromagnetic shielding plates 112 or the induction heating device 11 is generally non-linear with respect to temperature changes in the steel strip S under heating. Accordingly, the offset or multiplier is adjusted such that the movement amount tracks the changes in temperature. The offset or multiplier are also set in consideration of any limitations such as non-sensitive regions within a range of valid actions of the induction heating device 11 or the like, so as to suppress the effects thereof. Adjusting the offset or multiplier enables the electromagnetic shielding plates 112 or the induction heating device 11 to be tracked to meandering of the steel strip S.

In cases in which plural of the electromagnetic shielding plates 112 disposed along the conveyance direction are, for example, capable of moving independently of each other, the lag amount is set in consideration of the way the steel strip S is heated, with the movement start of a later (downstream) electromagnetic shielding plate 112 set so as to lag behind the movement start of an earlier (upstream) electromagnetic shielding plate 112.

The processing of steps S107 to S118 described above is repeated until the end of induction heating (step S119).

In the illustrated example, as long as the estimated displacement computed at step S109 is correct and the control of the electromagnetic shielding plates 112 or the induction heating device 11 is appropriate at steps S110 to S112, an appropriate temperature distribution should be obtained in which overheating at the width direction edges of the steel strip S is suppressed. The processing of steps S114 to S118 described above is executed to verify whether or not the above advantageous effects are actually being obtained.

In the interest of simplicity, explanation has been given regarding an example in which verification of the estimated displacement and updating of the approximation function f(t) (steps S114 to S116), and verification of the temperature distribution and adjustment of the parameters relating to movement (steps S117, S118) are executed independently of each other. However, the verification, updating, and adjustment may be executed in combination.

Specifically, for example, configuration may be made in which step S117 is executed first to determine whether or not the width direction temperature distribution of the steel strip S is permissible, and, in cases in which this temperature distribution is found at step S117 not to be permissible, then steps S114 to S116 are executed to verify the estimated displacement and update the approximation function f(t), and if the temperature distribution is still not permissible, then step S118 is executed to adjust the parameters relating to movement.

Alternatively, for example, verification of the estimated displacement and updating of the approximation function f(t) (steps S114 to S116), and verification of the temperature distribution and adjustment of the parameters relating to movement (steps S117, S118) may be executed at different periodicities to each other, or this processing may be executed in the reverse sequence to that described above.

The permissible range of errors employed in the determination of step S115 may also be revised as appropriate. For example, if there are many cases in which the error is falling outside the permissible range, then the permissible range of errors employed in the determination of step S115 may be adjusted to a wider range.

In the exemplary embodiment described above, employing the estimated displacement enables appropriate induction heating of the steel strip S to be performed even if the steel strip S undergoes complex meandering. Namely, by controlling the relative positional relationship between the induction heating device 11 and the steel strip S in the width direction of the steel strip S based on the estimated displacement, the steel strip S can be subjected to appropriate induction heating. Accordingly, the electromagnetic shielding plates 112 can be moved to follow the width direction meandering of the steel strip S with high precision, enabling the width direction edges of the steel strip S to be reliably prevented from overheating. In particular, in the present exemplary embodiment, the estimated displacement can be found based on a function expressing the displacement $\Delta x$. Complex control is thereby realized that accommodates the effects of meandering with a long periodicity and a short periodicity, meandering that can be expressed by plural oscillation modes superimposed on each other, and in addition meandering caused by the shape of the steel strip S (such as sheet joint locations). Width direction meandering of the steel strip S can thereby be accommodated with higher precision as a result.

Moreover, in the present exemplary embodiment, verification as to whether the advantageous effects of appropriate induction heating are actually being achieved is performed, enabling induction heating of the steel strip S to be continued while the approximation function f(t) employed in computation of the estimated displacement and parameters employed to control the electromagnetic shielding plates 112 are being autonomously updated.

Note that the verification steps such as those described above do not necessarily always have to be executed automatically by the computation device 122, and may, for example be executed according to an instruction input by an operator monitoring the width direction temperature distribution of the steel strip S as measured by the temperature scanner 121. The control device 12 may also include at least one out of an output device, such as a display or printer to output the width direction temperature distribution of the steel strip S as measured by the temperature scanner 121, the approximation function f(t) identified by the computation device 122, or parameters to move the electromagnetic shielding plates 112 or the induction heating device 11 in order to enable either monitoring by an operator during or verification after the event, or an input device to receive input of operator instructions.

Modified Example

Figure 8:
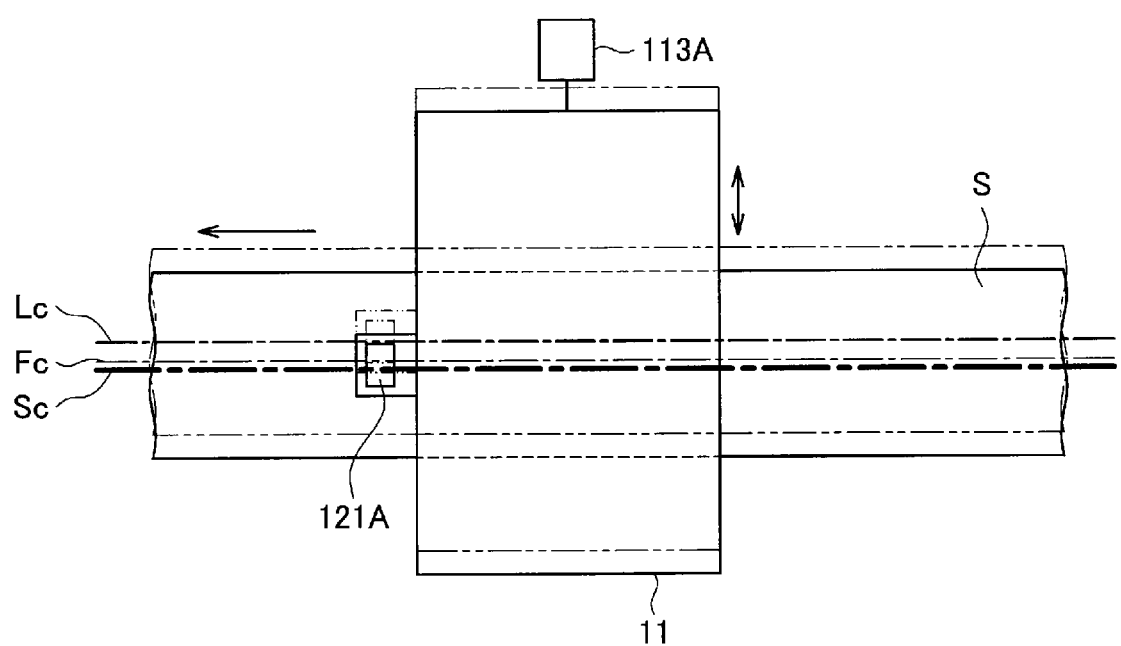
FIG. 8 is a diagram illustrating a modified example in which an induction heating device is moved as a whole in the induction heating apparatus illustrated in FIG. 1.

FIG. 8 is a diagram illustrating a modified example of the example illustrated in FIG. 2, and illustrates an example in which the induction heating device 11 is moved as a whole in the width direction of the steel strip S. In the example illustrated in FIG. 8, an induction heating apparatus 10A includes an actuator 113A to move the induction heating device 11 in the width direction of the steel strip S as indicated by the arrows in the drawing. The actuator 113A is connected to the computation device 122 included in the control device 12 illustrated in FIG. 1. The actuator 113A moves the induction heating device 11 according to control signals transmitted from the computation device 122. As explained with reference to FIG. 2 and so on, the electromagnetic shielding plates 112 in the induction heating device 11 are disposed so as to cover an appropriate width from the width direction edges of the steel strip S when the width direction center line Sc of the steel strip S is aligned with the width direction center line Lc of the pass line. Even in cases in which the width direction center line Sc has deviated from the width direction center line Lc of the pass line due to meandering of the steel strip S, if the actuator 113A is employed to move the induction heating device 11 such that, as illustrated in FIG. 8, the width direction center line Fc of the induction heating device 11 is moved close to or aligned with the width direction center line Sc of the steel strip S, the correct position of the electromagnetic shielding plates 112 can be maintained relative to the steel strip S, enabling overheating or insufficient heating to be prevented.

Note that the example illustrated in FIG. 8 described above may for example be applied in cases in which the amount of meandering of the steel strip S is large. The control method of the actuator 113A based on the measurement results from the temperature scanner 121 is similar to that described above with reference to FIG. 4, FIG. 5A, and FIG. 5B. As illustrated in FIG. 8, the temperature scanner 121 may be fixed to the induction heating device 11 using a jig 121A or the like, so as to be moved together with the induction heating device 11. In such cases, the design width direction center line of the steel strip S employed as the datum for the displacement $\Delta x$ may be configured as the width direction center line Fc of the induction heating device 11.

The temperature scanner 121 may be fixed independently of the induction heating device 11, and may measure the temperature taking the width direction center line Lc of the pass line as a center line, irrespective of movement of the induction heating device 11. In such cases, the design width direction center line of the steel strip S employed as the datum for the displacement Δx may be configured as the width direction center line Lc of the pass line similarly to in the example of FIG. 2 (not necessarily aligned with the width direction center line Fc of the induction heating device 11).

The example illustrated in FIG. 8 described above may be combined with the example illustrated in FIG. 2. Namely, a configuration may be adopted that is provided with both the actuator 113A to move the induction heating device 11 in the width direction of the steel strip S, and the actuator 113 to move the electromagnetic shielding plates 112 within the induction heating device 11 in the width direction of the steel strip S. In such cases, the computation device 122 is connected to both the actuators 113, 113A, and the basically lighter and faster-moving actuators 113 are employed to move the electromagnetic shielding plates 112 to the appropriate positions. In cases in which the computation result exceeds the controllable range of the shielding plates or is predicted to fall outside the controllable range of the shielding plates, the actuator 113A is employed to move the induction heating device 11 so as to align the width direction center line Fc with the width direction center line Sc of the steel strip S. Alternatively, in cases in which the movement amount is insufficient, the computation device 122 may divide the movement amount into a required movement amount of the induction heating device 11 and a required movement amount of the electromagnetic shielding plates 112. The induction heating device 11 and the electromagnetic shielding plates 112 are thereby moved at the same time using the actuators 113, 113A, thereby enabling the electromagnetic shielding plates 112 to be moved swiftly to appropriate positions.

Second Exemplary Embodiment

Figure 9:
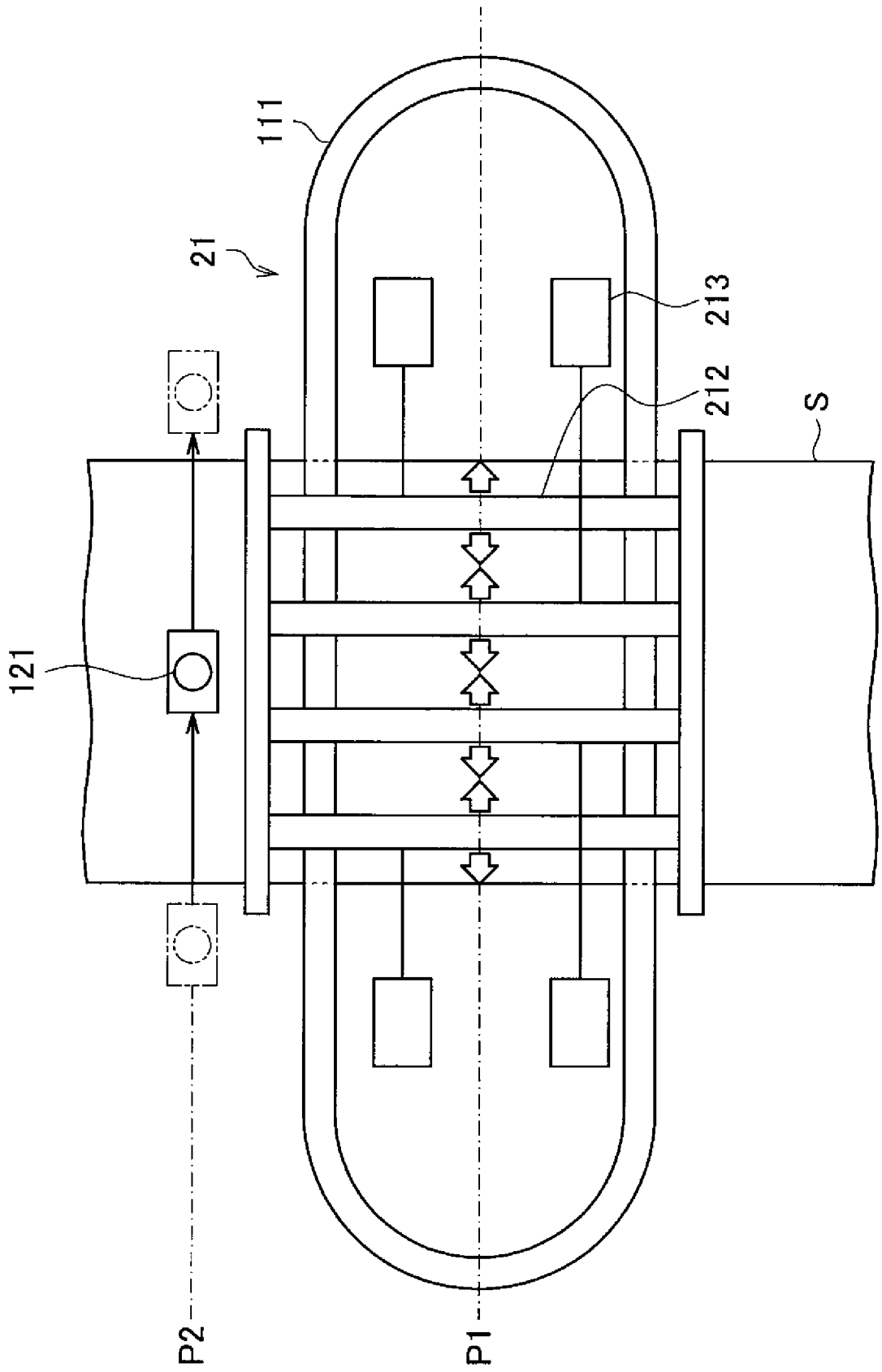
FIG. 9 is a diagram illustrating an example of placement of a temperature scanner and an induction heating device provided with a divided magnetic core in an induction heating apparatus according to a second exemplary embodiment of the present invention.

FIG. 9 is a diagram illustrating an example of placement of an induction heating device and a temperature scanner provided with divided magnetic cores 212 of an induction heating apparatus according to a second exemplary embodiment of the present invention. With the exception of the configuration of an induction heating device 21 illustrated in FIG. 9, the configuration of the present exemplary embodiment is similar to that of the first exemplary embodiment described above with reference to FIG. 1 and so on, and duplicate explanation thereof is omitted. Moreover, with the exception of the target of control for movement based on the estimated displacement (step S13 in FIG. 6 and step S112 in FIG. 7B) being the magnetic cores 212, the induction heating processes of the present exemplary embodiment are similar to those of the first exemplary embodiment illustrated in FIG. 6, FIG. 7A, and FIG. 7B, and explanation thereof is omitted.

As illustrated in FIG. 9, the induction heating device 21 includes the induction coils 111, the magnetic cores 212, and actuators 213 to move the magnetic cores 212 in the width direction of the steel strip S as indicated by the arrows in the drawing. The magnetic cores 212 change the position where magnetic flux generated by the induction coils 111 is concentrated. The actuators 213 are connected to the computation device 122 including the control device 12 illustrated in FIG. 1, and move the magnetic cores 212 according to control signals transmitted from the computation device 122. The magnetic cores 212 are disposed at correct positions relative to the steel strip S, specifically at positions separated by an appropriate distance from the width direction edges of the steel strip S. This prevents overheating that might otherwise arise due to the eddy current density increasing at the width direction edges of the steel strip S, thereby enabling adjustments to be made to the width direction temperature distribution by concentrating magnetic flux at positions in the width direction where the temperature of the steel strip S is falling so as to increase the temperature thereat.

Although the principles of action for the magnetic cores 212 included in the induction heating device 21 of the present exemplary embodiment are different, from the standpoint that they prevent overheating of the width direction edges of the steel strip S by appropriate control of the relative positional relationships between the magnetic cores 212 and the steel strip S in the width direction of the steel strip S, and that the temperature is guaranteed, they are similar to the electromagnetic shielding plates 112 of the first exemplary embodiment. Accordingly, the present exemplary embodiment also enables overheating of the width direction edges of the steel strip S to be more reliably prevented by moving the magnetic cores 212 based on the estimated displacement of the steel strip S at the position P1 of the induction heating device 21 upstream as computed by extrapolating the displacement Δx in the width direction of the steel strip S as detected at the position P2 of the temperature scanner 121 downstream, such that the magnetic cores 212 are moved to track meandering in the width direction of the steel strip S at high precision.

Third Exemplary Embodiment

Figure 10:
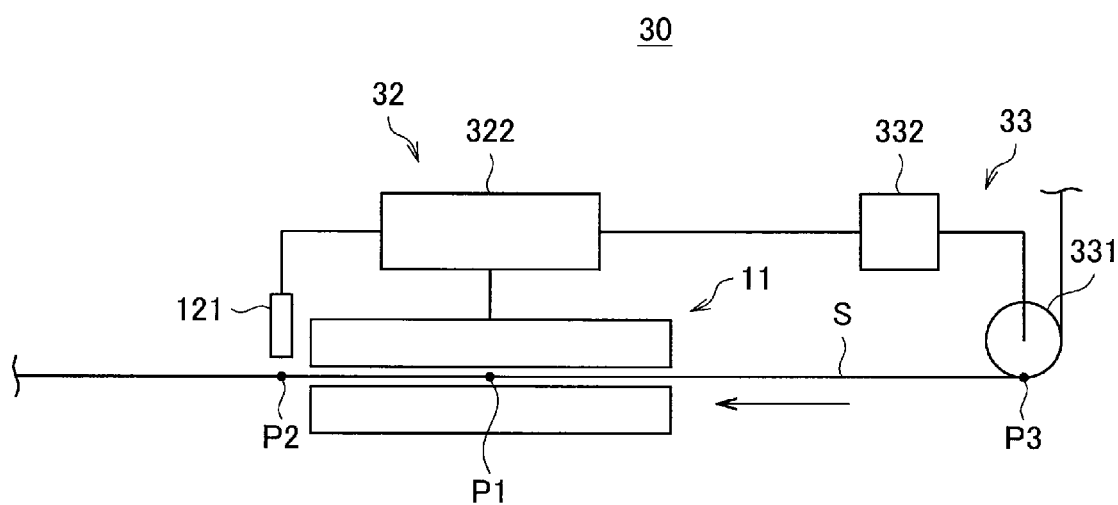
FIG. 10 is a diagram illustrating a schematic configuration of an induction heating apparatus according to a third exemplary embodiment of the present invention.

FIG. 10 is a diagram illustrating a schematic configuration of an induction heating apparatus according to a third exemplary embodiment of the present invention. Note that elements configuring an induction heating apparatus 30 illustrated in FIG. 10 that are labeled with common reference numerals to those of the first exemplary embodiment, and processes in the flowcharts described below that are labeled with common reference numerals to those of the first exemplary embodiment, are similar to their counterparts explained in the first exemplary embodiment, and duplicate explanation thereof is omitted.

As illustrated in FIG. 10, the induction heating apparatus 30 includes the induction heating device 11, a control device 32, and a steering mechanism 33. The control device 32 includes the temperature scanner 121 and a computation device 322. The steering mechanism 33 includes a steering roll 331 disposed at a position P3 on the pass line of the steel strip S, and an actuator 332 to tilt the steering roll 331. Based on the same definitions as those employed in FIG. 1, the position P3 of the steering roll 331 on the pass line of the steel strip S is upstream of the position P1 of the induction heating device 11. Note that in another exemplary embodiment, the position P3 may be downstream of a position P2. Similarly to in the first exemplary embodiment, although the steel strip S is illustrated as being conveyed in a horizontal direction in FIG. 10, a metal strip such as the steel strip S may be conveyed in a vertical direction in another exemplary embodiment.

The steering roll 331 abuts the steel strip S along substantially the width direction of the steel strip S, but may be tilted slightly with respect to the width direction. This enables changes to be made to the tension on the two width direction sides of the steel strip S so as to suppress width direction displacement of the steel strip S. The actuator 332 is connected to the computation device 322, and the angle of tilt of the steering roll 331 is adjusted according to a control signal transmitted from the computation device 322. In the present exemplary embodiment, the computation device 322, the actuator 332, and the steering roll 331 configure an external force application section to impart external force to the steel strip S to suppress displacement in the width direction of the steel strip S.

Figure 11A:
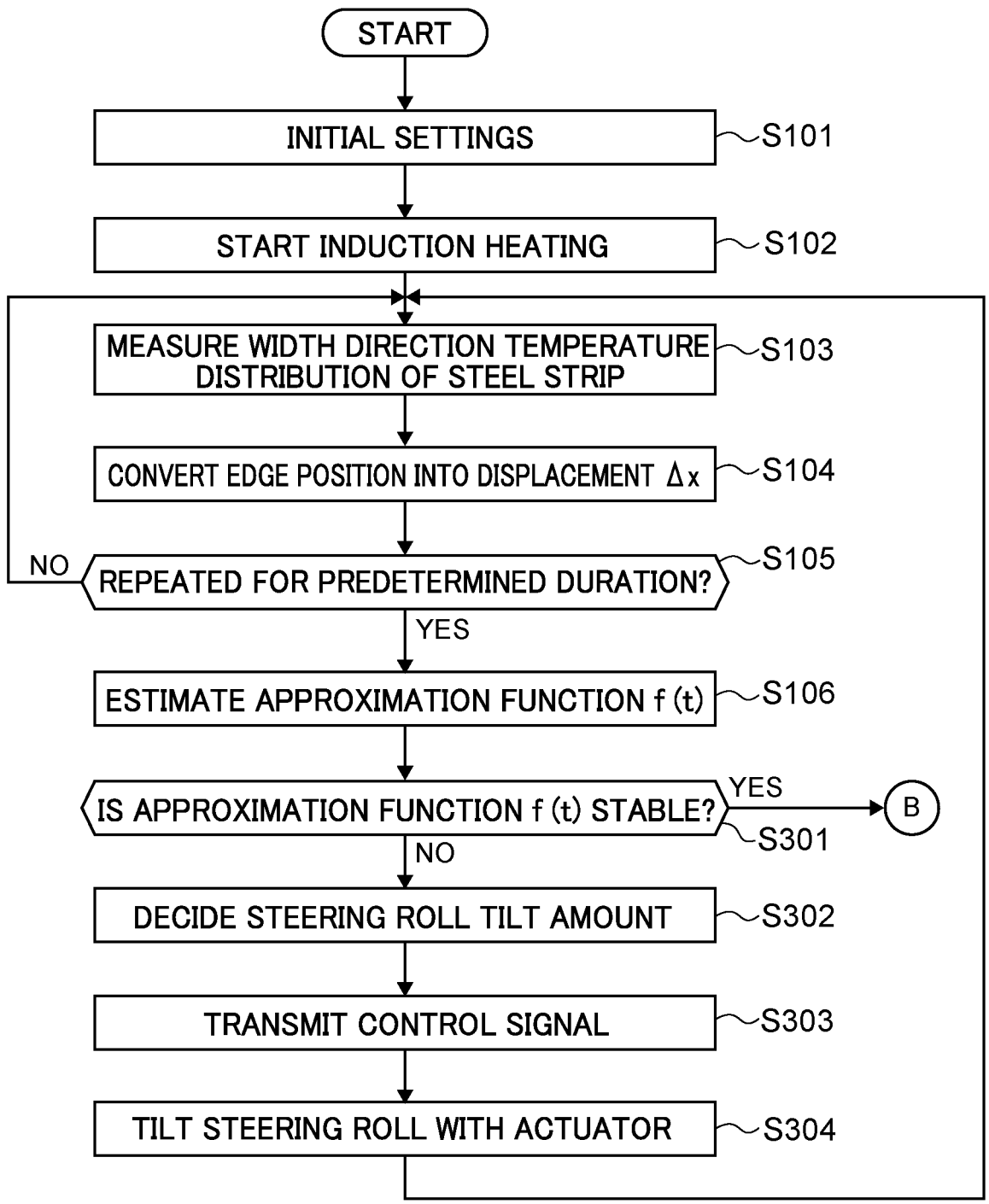
FIG. 11A is a flowchart illustrating an example of processes of an induction heating method according to the third exemplary embodiment of the present invention.
Figure 11B:
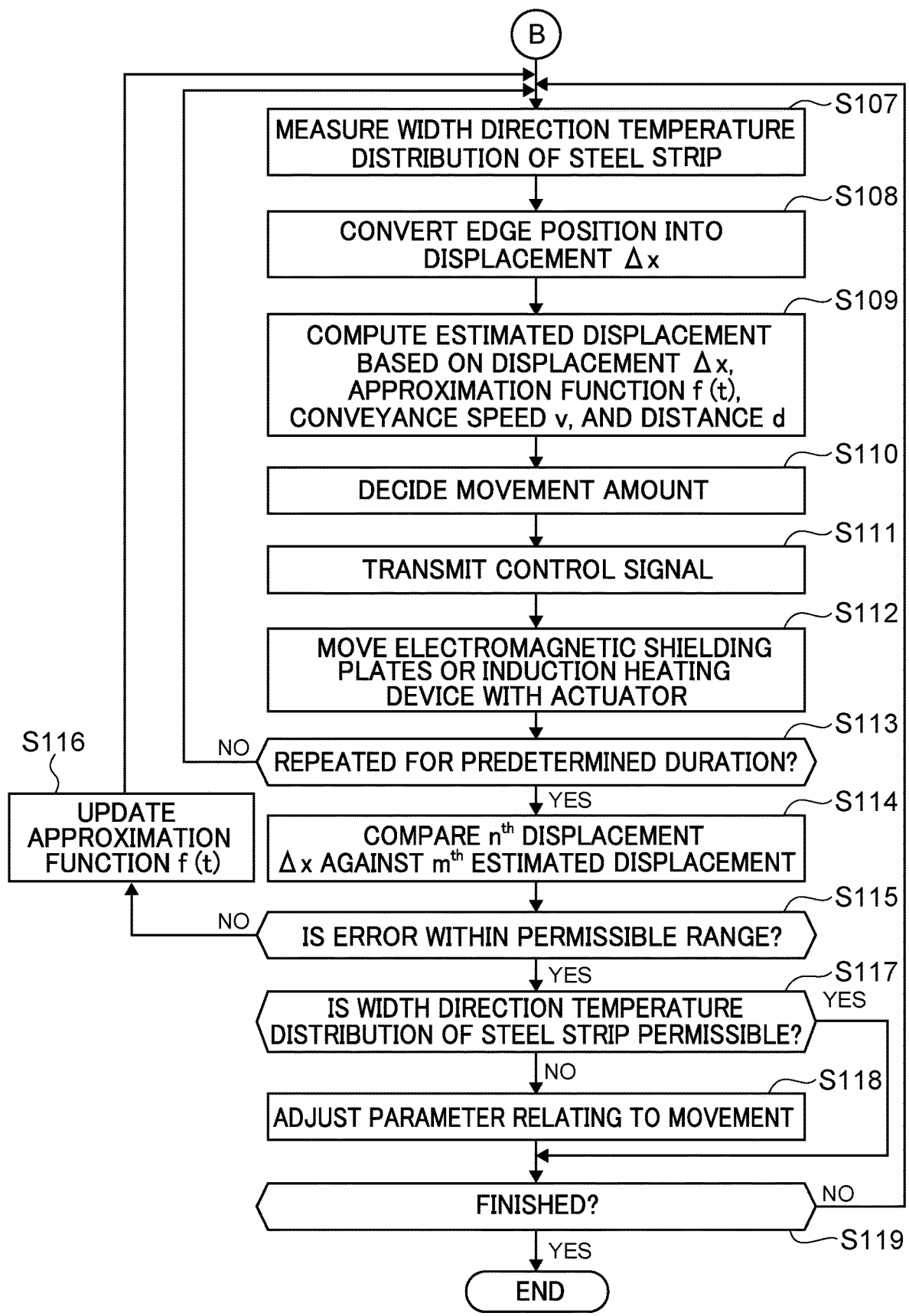
FIG. 11B is a flowchart illustrating an example of processes of an induction heating method according to the third exemplary embodiment of the present invention.

FIG. 11A and FIG. 11B are flowcharts illustrating examples of processes of an induction heating method according to the third exemplary embodiment of the present invention. In the example illustrated in FIG. 11A, the processing of steps S101 to S106 is performed in a manner similar to the processing of steps S101 to S106 in the first exemplary embodiment described above. After the approximation function f(t) has been estimated at step S106, the computation device 322 determines whether or not the approximation function f(t) is stable (step S301). More specifically, for example, the computation device 322 does this by determining whether or not the periodicity for changes to the displacement Δx computed using the approximation function f(t) is too short and whether or not the amplitude of the displacement Δx is too large. In cases in which the approximation function f(t) is determined to be stable at step S301, as illustrated in FIG. 11B, the processing of steps S107 to S119 is executed similarly to in the first exemplary embodiment.

In cases in which the approximation function f(t) is determined not to be stable at step S301, the computation device 322 decides an amount to tilt the steering roll 331 according to a trend in the approximation function f(t) (step S302), and transmits a control signal corresponding to the tilt amount to the actuator 332 (step S303). The steering roll 331 is then tilted by the action of the actuator 332 receiving the control signal (step S304). In cases in which the steering roll 331 was tilted at step S304, a change to the approximation function f(t) is anticipated, and so processing returns to step S103.

In the third exemplary embodiment of the present invention as described above, the steering roll 331 is tilted according to a trend in the approximation function f(t), and more specifically according to whether or not the approximation function f(t) is stable, and an external force is thereby applied to suppress displacement in the width direction of the steel strip S. Accordingly, for example, the electromagnetic shielding plates 112 can be moved so as to track meandering of the steel strip S by lengthening the periodicity of changes to the displacement Δx, or by reducing the amplitude of the displacement Δx. As a result, the approximation function f(t) is again identified after using the steering roll 331 to stabilize changes to the displacement Δx so as to enable control of the electromagnetic shielding plates 112 to be executed based on the estimated displacement computed using the approximation function f(t). Although a case is envisaged above in which the positions of the temperature scanner 121 and the steering roll 331 are separated from each other and the time constant is comparatively large, in cases in which the time constant is small, the actuator 332 for tilting the steering roll 331 may be controlled using proportional integral differential control (PID control) or the like so as to minimize the amount by which the width direction center line Sc of the steel strip S illustrated in FIG. 3B and the like deviates from the width direction center line Lc of the pass line.

Note that although explanation has been given above regarding an example in which the induction heating apparatus 30 includes the induction heating device 11 similarly to in the first exemplary embodiment, in another example the induction heating apparatus may include an induction heating device 21 similar to that of the second exemplary embodiment in addition to the steering mechanism 33.

Detailed explanation has been given regarding preferable exemplary embodiments of the present invention, with reference to the attached drawings. However, the present invention is not limited to these examples. It would be obvious to a practitioner of ordinary skill in the field of the technology of the present invention that various modifications and improvements may be arrived at within the technical concept as recited in the scope of the patent claims, and obviously such modifications and improvements should be understood to fall within the technical scope of the present invention.

Although a width direction displacement of the steel strip S is detected based on measurement results of a width direction temperature distribution for the steel strip S in the exemplary embodiments described above, the present invention is not limited to such examples. For example, the displacement Δx1 of the steel strip S at the first position P1 may be detected using a meandering sensor or the like. Moreover, the position where the width direction displacement of the steel strip S is detected is not limited to a position downstream of the induction heating device as described above, and may be an upstream position. Even in cases in which the width direction displacement of the steel strip S is detected upstream of the induction heating device, the precision with which the positional relationship between the induction heating device and the steel strip S is controlled can still be improved by employing an estimation for the position at the induction heating device as computed by extrapolating the approximation function.

Moreover, although explanation has been given in the exemplary embodiments regarding examples in which the temperature scanner 121 is employed as a sensor included in a detection section to detect the displacement Δx in the width direction of the steel strip S, the present invention is not limited to such examples. It is sufficient that the width direction displacement Δx of the steel strip S can be detected by the detection section, and for example a laser sensor may be employed as a sensor of the detection section, or various other sensors such as a proximity sensor or sensor capable of detecting metal may be employed therefor.

Although explanation has been given in the exemplary embodiments described above regarding examples in which the approximation function f(t) is computed based on a time series of changes in the displacement Δx, the present invention is not limited to such examples. For example, as the approximation function f(t), an approximation function f(t) that has been stored in advance may be employed based on past operational outcomes, simulation results, or the like.

EXPLANATION OF THE REFERENCE NUMERALS 10, 30 induction heating apparatus
11, 21 induction heating device
12, 32 control device
33 steering mechanism
111 induction coil
112 electromagnetic shielding plate
113, 213, 332 actuator
121 temperature scanner 122, 322 computation device
212 magnetic core
331 steering roll

The invention claimed is:

1. An induction heating method for a metal strip, employed to heat a continuously conveyed metal strip using an induction heating device disposed at a first position on a pass line, the metal strip induction heating method comprising:
  detecting a displacement from a predetermined datum line of a width direction center line of the metal strip at a second position on the pass line that is different from the first position, by:
    scanning a range in a width direction of the metal strip, to measure a temperature distribution in the width direction of the metal strip, a center line of the temperature distribution that passes through midpoints of temperature drops at both edges of the metal strip in the width direction corresponding to the width direction center line of the metal strip, and
    detecting displacement of the width direction center line of the metal strip relative to the predetermined datum line;
  computing an estimated displacement of the width direction center line of the metal strip at the first position by temporal and spatial extrapolation of the displacement based on a function expressing a time series of changes in the displacement; and
  controlling a relative positional relationship between the induction heating device and the metal strip in a width direction of the metal strip based on the estimated displacement,
  wherein, when computing the estimated displacement:
    the time series of changes in the displacement is converted into the function; and
    the estimated displacement at a first time is computed based on a conveyance speed of the metal strip, a distance between the first position and the second position, the function, and the displacement at the first time.

2. The metal strip induction heating method of claim 1, wherein the second position is a position downstream of the first position.

3. The metal strip induction heating method of claim 1, wherein the second position is a position upstream of the first position.

4. The metal strip induction heating method of claim 1, further comprising a step of updating the function based on a result of comparing the displacement at a second time later than the first time against the estimated displacement computed based on the displacement at the first time.

5. The metal strip induction heating method of claim 1, further comprising a step of applying an external force to the metal strip to suppress displacement in the width direction of the metal strip according to periodicity of changes in the displacement and an amplitude of the displacement of the function.

6. The metal strip induction heating method of claim 1, wherein, when controlling the relative positional relationship, the induction heating device, a part of the induction heating device, or any combination thereof, is moved in the width direction of the metal strip.

* * * * *